2 Sheets, Sheet 1

*J. B. Hurt,*
*Water Wheel.*

Nº 12,779. Patented May 1, 1855.

2 Sheets Sheet 2

J. B. Hurt,
Water Wheel.

N° 12,779.　　　Patented May 1, 1855.

UNITED STATES PATENT OFFICE.

JAMES B. HURT, OF NOTTOWAY COUNTY, VIRGINIA.

MODE OF APPLYING ECCENTRIC WHEELS TO WATER-PRESSES.

Specification of Letters Patent No. 12,779, dated May 1, 1855.

*To all whom it may concern:*

Be it known that I, JAMES B. HURT, of Nottoway county and State of Virginia, have invented a new and Improved Water-Wheel for Grist-Mills; and I do hereby declare that the following is a full and exact description thereof, reference being had to this specification and the accompanying drawings, in which—

Figure 1:
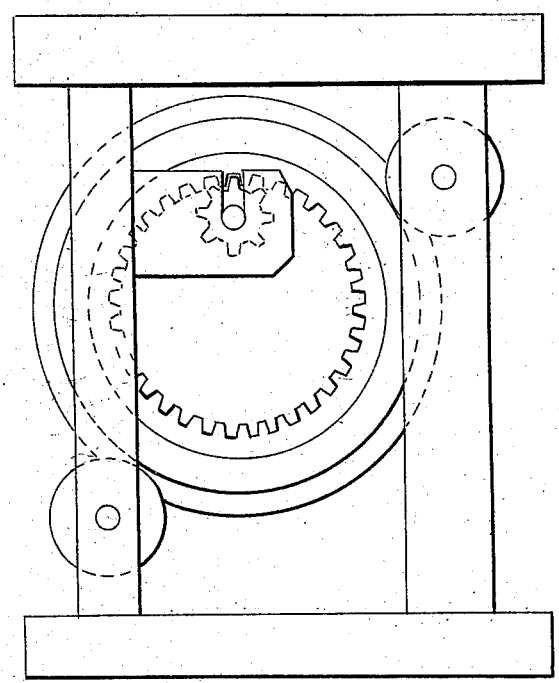
Figure 2:
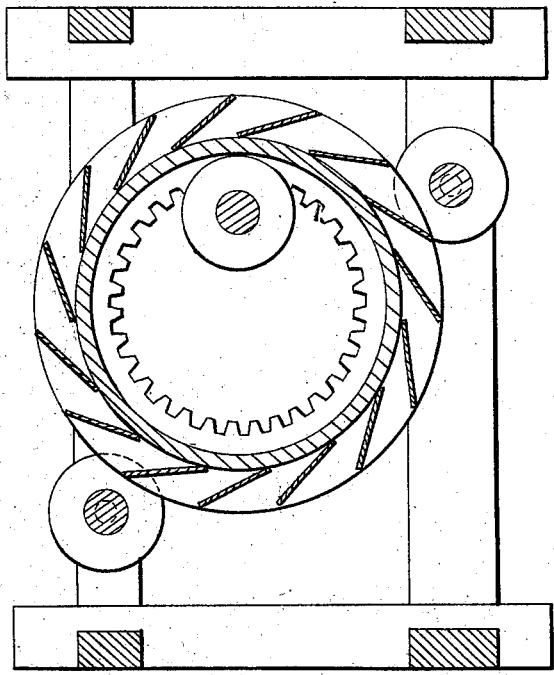

Figure 1 is a side elevation, and Fig. 2 a right vertical section of the wheel.

The nature of my invention consists in a water wheel without arms or main shaft to revolve on two wheels on one shaft underneath, each wheel to have flanges on the outside to keep the water wheel in its true position. These two wheels act in the capacity of revolving fulcrums, the distance of these wheels apart to correspond with the width of the water wheel, so that the two outer rims will rest and revolve upon them. These revolving fulcrums are placed nearest the back of water wheel underneath, by this means the weight of the wheel is thrown forward and the lever power lengthened out near the whole diameter of the water wheel, thereby giving it great power with but little water to operate it. On the inside of this water wheel a shaft extends across horizontally, nearly over the fulcrum wheels. On this shaft a cogged wallower is fixed, gearing into the cogged segments on the inner surface of middle rim of water wheel.

To enable others skilled in the art to make and use my invention I will proceed to describe its construction and operation.

I construct my water wheel with three rims, or only two if necessary. On the middle rim I have cast segments with cogs, bolted on the inside. I have ties of thin and thick timbers alternately shouldered and bolted on the inner surface of water wheel which forms the soling of said wheel as well as to make it strong and permanent. On the inside of this water wheel I have a horizontal shaft extending across nearly over the fulcrum wheels. A wallower is fixed on this shaft gearing into the cogged segments of middle rim of water wheel. On the outer ends of this shaft I have cogged or band wheels which drive the pinion on mill spindle.

What I claim as my invention and desire to secure by Letters Patent is,

The water wheel without arms or main shaft, revolving on fulcrum wheels underneath, thereby lengthening out the lever power near the whole diameter of the wheel, the thin and thick interstices shouldered and bolted to each rim, the cast segments bolted to middle rim which gears into the cogs of wallower on horizontal shaft extending across on the inside of water wheel, also the two revolving fulcrum wheels with flanges on the outside of each wheel, to keep the water wheel in its true position.

JAMES B. HURT.

Witnesses:
  SAML. GRUBB,
  JOHN CAISSEY.